(12) United States Patent
Flottvik

(10) Patent No.: US 7,749,359 B2
(45) Date of Patent: Jul. 6, 2010

(54) CLOSED RETORT CHARCOAL REACTOR SYSTEM

(75) Inventor: John Flottvik, Fort Langley (CA)

(73) Assignee: 0752831 B.C. Ltd., Surrey (CA)

( * ) Notice: Subject to any disclaimer, the term of this patent is extended or adjusted under 35 U.S.C. 154(b) by 957 days.

(21) Appl. No.: 11/409,019

(22) Filed: Apr. 24, 2006

(65) Prior Publication Data

US 2007/0209923 A1    Sep. 13, 2007

(30) Foreign Application Priority Data

Mar. 10, 2006   (CA) ................................. 2539012

(51) Int. Cl.
*C10B 7/10*   (2006.01)

(52) U.S. Cl. ...................... 202/118; 202/262; 202/265; 202/117

(58) Field of Classification Search ................ 202/118, 202/265, 262, 117; 585/240, 241, 242
See application file for complete search history.

(56) References Cited

U.S. PATENT DOCUMENTS

| | | | |
|---|---|---|---|
| 647,354 A | 4/1900 | Anderson | |
| 3,471,369 A | 10/1969 | Cox et al. | |
| 4,217,175 A | 8/1980 | Reilly | |
| 4,308,103 A | 12/1981 | Rotter | |
| 4,412,889 A * | 11/1983 | Oeck ........................... | 202/117 |
| 4,495,033 A | 1/1985 | Rathbun et al. | |
| 4,686,008 A * | 8/1987 | Gibson ........................ | 202/118 |
| 4,908,104 A * | 3/1990 | Loomans et al. .............. | 201/25 |
| 5,705,035 A * | 1/1998 | Avetisian et al. ................ | 201/3 |
| 6,039,774 A * | 3/2000 | McMullen et al. ......... | 48/102 A |
| 6,536,939 B1 * | 3/2003 | Blue ........................... | 366/297 |
| 7,144,558 B2 * | 12/2006 | Smith et al. .................. | 422/224 |
| 7,416,641 B2 * | 8/2008 | Denison ...................... | 202/99 |

FOREIGN PATENT DOCUMENTS

| | | |
|---|---|---|
| AU | 9050613 | 3/1990 |
| CA | 1062192 | 9/1979 |
| CA | 1226840 | 9/1987 |
| CA | 2009666 | 8/1991 |
| CA | 2110282 | 12/1992 |
| CA | 2140898 | 2/1994 |
| CA | 2242279 | 2/2000 |
| FR | 594160 | 9/1925 |
| FR | 2720753 | 8/1995 |
| GB | 14800 | 1/1917 |
| GB | 1055634 | 1/1967 |
| JP | 58-501912 | 11/1981 |

* cited by examiner

*Primary Examiner*—N. Bhat
(74) *Attorney, Agent, or Firm*—Cameron IP

(57) ABSTRACT

A reactor is provided for converting organic material to charcoal, with the reactor having a furnace and a retort extending through the furnace. The retort has an auger extending therethrough, with the auger having a flight with gaps therein. Members project inwardly from the walls of the retort at the gaps in the flight to unplug blockages in the retort. A gas collection system is provided which has a branched portion having two or more venting tubes, each with valves so that each may be shut off independently to allow to off-line cleaning without requiring shutdown of the system. A method for converting organic material may be practiced by introducing combustible materials into the reactor.

23 Claims, 3 Drawing Sheets

CLOSED RETORT CHARCOAL REACTOR SYSTEM

FIELD OF THE INVENTION

This invention relates to apparatus and methods for producing charcoal in a continuous manner. In particular, the invention relates to apparatus and methods in which organic material is advanced by an auger through one or more retort tubes. The organic material is converted to charcoal by anaerobic heating in the retort tube.

BACKGROUND OF THE INVENTION

It is known that charcoal may be produced by moving organic material through retorts, or heated anaerobic vessels. For example, Canadian Patent Application No. 2,110,282 relates to a method of treating biomass material wherein the material is carried through a heated casing by an auger which runs the entire length of the heated casing.

Canadian Patent Application No. 2,140,898 discloses an apparatus that allows thermal dimensional changes of metal parts in a retort mechanism which incorporates heating and cooling stages and comprises a retort auger that extends the entire length of the retort.

Canadian Patent No. 2,242,279 discloses an apparatus for continuous charcoal production comprising a heated tubular retort with a screw element extending through the retort. The flight of the screw element is separated into sections by gaps coincident with gas vents penetrating the retort.

Japanese Patent Document 58-501912 discloses a method for manufacturing carbonised briquettes by introducing vegetable matter into a heated retort. The heated retort incorporates a screw to advance material through the retort.

Australian Patent Document 90 50613 discloses an apparatus for use in the production of charcoal comprising a hollow retort shell containing an auger for advancing material through the shell.

A significant problem with prior systems is that organic material often adopts a viscous liquid or semi-solid state at a certain stage during the conversion to charcoal. Tar and creosote are typical examples of such partially converted organic material. These materials are sticky and often form plugs within the retort, often where the retort is initially exposed to heat. Plugs impede the steady feed-through of material and in some instances can completely block the advance of organic material. Removing plugs can be costly, and may require shutting down the system and disrupting otherwise continuous charcoal production. Plugs can also prevent pyrolysis gases from properly venting from retorts. Gas condensers to which pyrolysis gases are vented may also become congested with partially converted organic material.

There is a need for apparatus and methods that reduce or eliminate plug formation and congestion in retort charcoal reactor systems.

SUMMARY OF THE INVENTION

This invention provides apparatus and methods for the continuous production of charcoal in retort charcoal reactors while reducing or eliminating the above-mentioned problems with prior systems.

The following embodiments and aspects thereof are described and illustrated in conjunction with apparatus and methods which are meant to be exemplary and illustrative, not limiting in scope.

In one embodiment of the invention, a reactor is provided for converting organic material, the reactor comprising:
(a) a furnace;
(b) a retort extending through the furnace;
(c) an auger extending through the retort, the auger comprising a flight; and,
(d) one or more members projecting from an interior surface of the retort;

wherein the flight comprises two or more sections separated by one or more longitudinally extending gaps wherein the flight is at least partially removed, the gaps being coincident with the one or more members.

In one embodiment of the invention, the members may be pins removably threaded through the wall of the retort.

In one embodiment of the invention, the reactor has a gas collection and condensation system, the system comprising:
(a) one or more gas vents penetrating the retort;
(b) a collection vent in fluid communication with the one or more gas vents;
(c) a transfer vent in fluid communication with the collection vent, the transfer vent comprising a plurality of arms, each arm comprising a valve; and,
(d) a gas condenser comprising a plurality of branches, each branch in fluid communication with a corresponding arm, each branch comprising a cleaning means;

wherein closing any of the valves directs gases from the retort to the gas condenser through any of the arms with open valves, permitting the branch corresponding to the arm with the closed valve to be cleaned by the cleaning means.

A method is also provided for converting organic material, the method comprising:
(a) introducing the organic material into an interior of a retort at an inlet region of the retort;
(b) advancing the organic material through the interior by rotating an auger extending through the interior, wherein the auger comprises a core and a flight; and
(c) disrupting any plugs of the organic material in the interior by providing one or more members fixed to the retort and projecting into the interior, the one or more members coinciding with longitudinally extending gaps in the flight.

In addition to the exemplary aspects and embodiments described above, further aspects and embodiments will become apparent by reference to the drawings and the following detailed description.

BRIEF DESCRIPTION OF THE DRAWINGS

In drawings which illustrate non-limiting specific embodiments of the invention.

DETAILED DESCRIPTION

Figure 1:
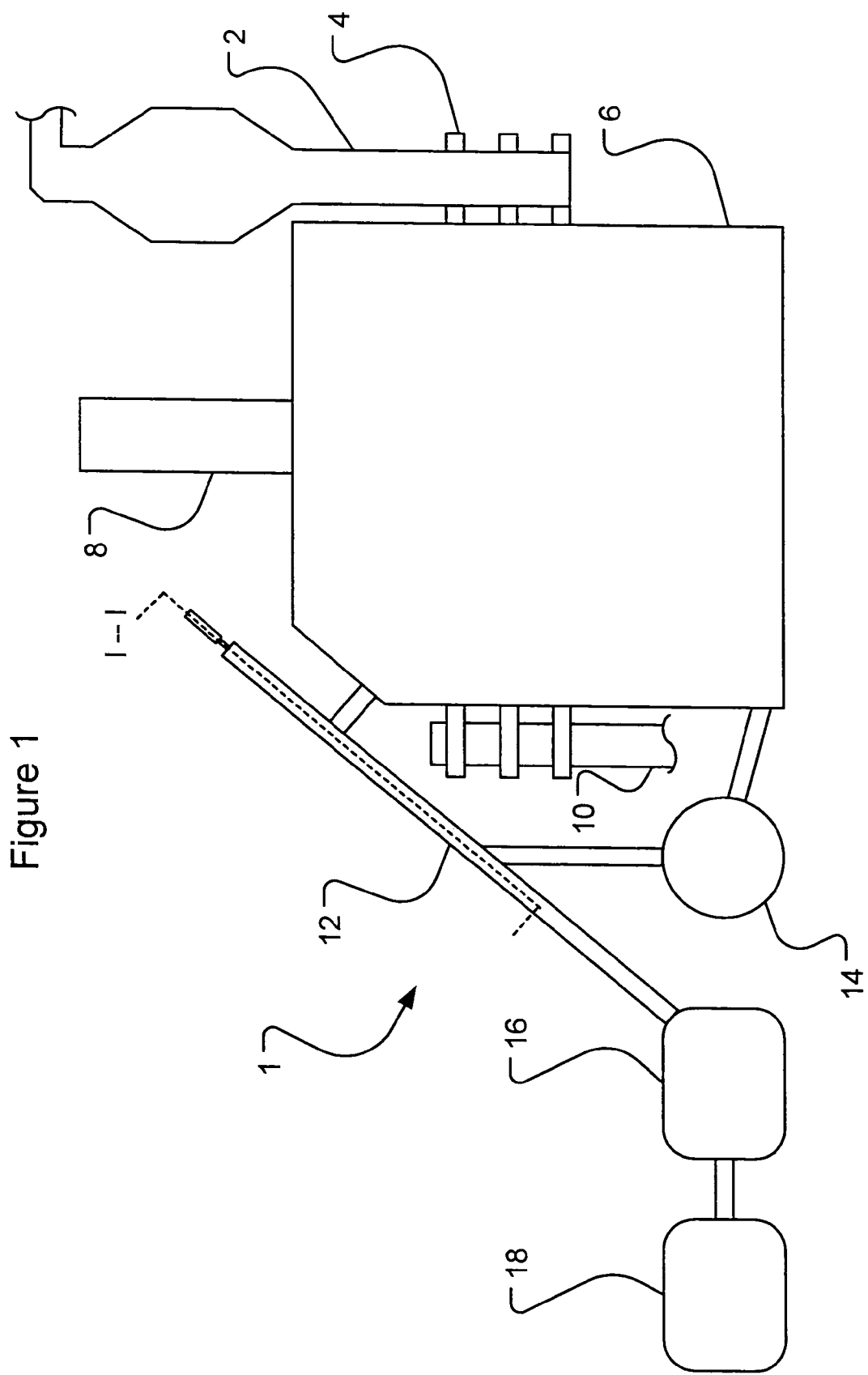
FIG. 1 is a semi-schematic side view of a reactor according to one embodiment of the invention.

A reactor 1 according to one embodiment of the invention is shown in FIG. 1. Feed system 2 supplies organic material to one or more anaerobic retorts 4. Organic material may be wood waste or agricultural waste, for example. Heat provided by furnace 6 converts the organic material advancing through retorts 4 into charcoal. Exhaust from combustion of fuel used to heat furnace 6 is released at stack 8. Charcoal produced in retorts 4 is collected at chute 10. Pyrolysis gases released during charcoal production are vented from retorts 4 to condenser 12. The gases are cooled in condenser 12 to form a distillate. The distillate may be routed to tank 14 for use as fuel to heat furnace 6, or to boiler 16 for use as fuel to drive turbine 18.

Figure 2:
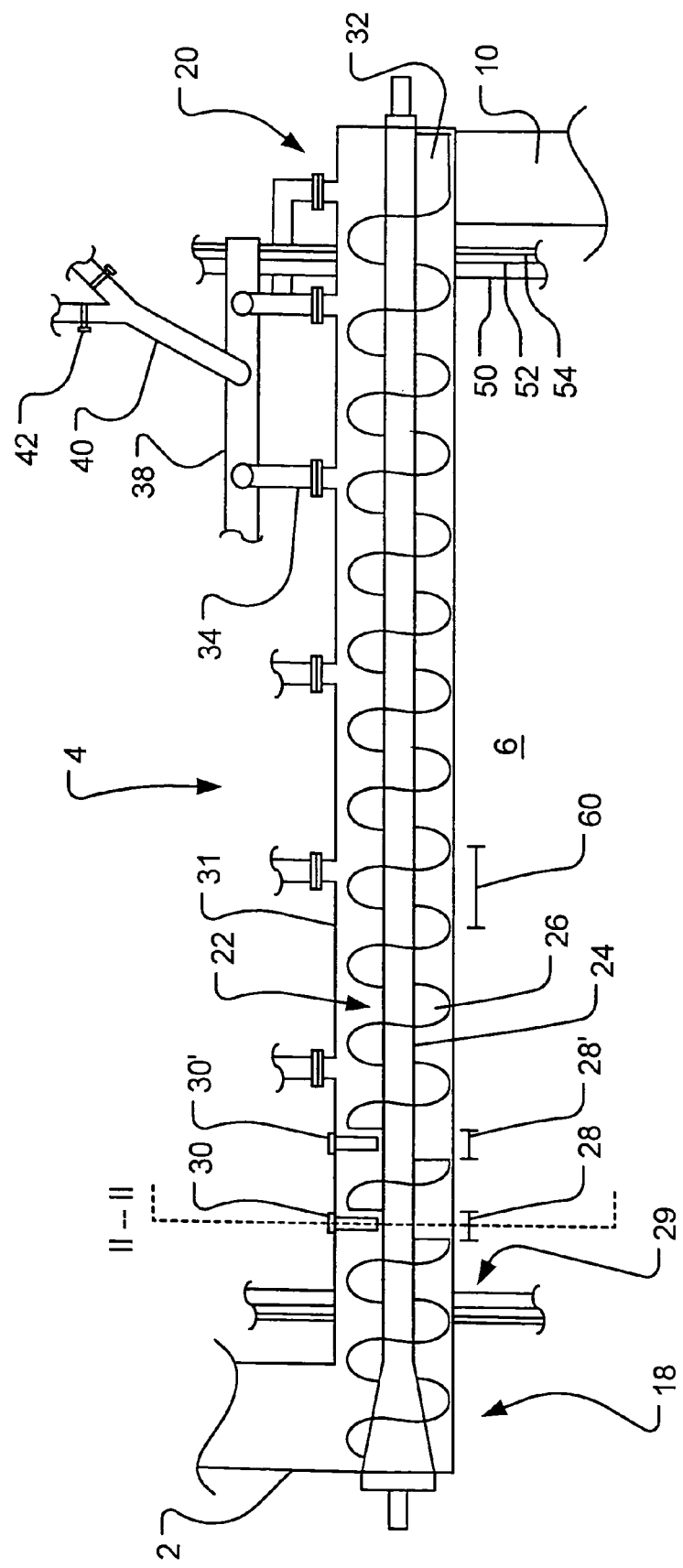
FIG. 2 is a cutaway side view of a retort according to one embodiment of the invention.

Retort 4 according to one embodiment of the invention is shown in FIG. 2. Retort 4 has inlet region 18 and outlet region 20. Feed system 2 loads organic material into inlet region 18. Organic material converted to charcoal is collected by chute 10 at outlet region 20. The bulk of retort 4 is sealed within the interior of furnace 6.

Auger 22 extends through the interior of retort 4. Auger 22 is rotated along its longitudinal axis by a motor (not shown). The main components of auger 22 are core 24 and helical flight 26.

Core 24 has a constant diameter except at inlet region 18 where core 24 widens. As shown in FIG. 2, the diameter of core 24 may be widest at the upstream end of retort 4 and taper to a narrower constant diameter at approximately upstream wall 29 of furnace 6. The widening of core 24 reduces the volume of organic material that could otherwise be loaded into retort 4 by feed system 2 at any given time. Reducing the volume of incoming organic material reduces the likelihood of organic material forming plugs in retort 4.

Figure 4:
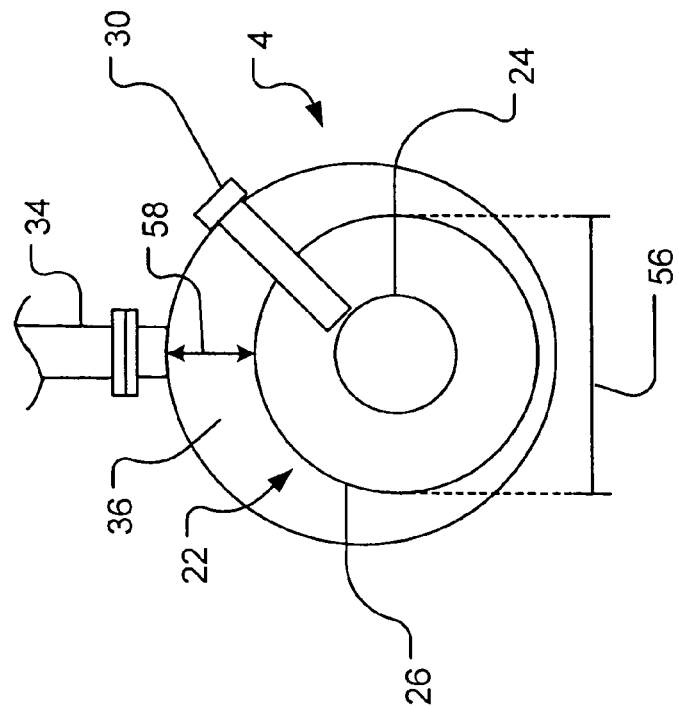
FIG. 4 is a view corresponding to plane II-II of the retort shown in FIG. 2.

Auger 22 has gap sections 28, 28' where a portion of flight 26 has been removed. Gap sections 28, 28' are located downstream of upstream wall 29 of furnace 6. One or more projections 30 correspond to each gap section 28. Projections 30, 30' are removably fixed to retort 4 and project radially from the interior surface of retort 4 toward core 24 of auger 22. As shown in FIG. 4, projections 30, 30' may be pins inserted through wall 31 of retort 4, for example. Projections 30, 30' serve to break up any plugs to allow free and continuous advancement of organic material through retort 4.

Flight 26 forms one or more fins 32 at outlet region 20 of retort 4. The base of fin 32 is fixed to core 24 in parallel to the longitudinal axis of auger 22. Fin 32 projects radially from core 24 toward the interior surface of retort 4. Organic material advanced to outlet region 20, which is mostly charcoal by this stage, is swept into chute 10 by the broad side of fin 32 as auger 22 rotates. Fin 32 thereby prevents buildup of organic material at outlet region 20.

The longitudinal axis of auger 22 is offset in relation to the longitudinal axis of retort 4 as shown in FIG. 4. Auger 22 is generally offset in a direction opposite to the location of exhaust gas vents 34. Enlarged path 36 in retort 4 resulting from the offset of auger 22 improves venting of pyrolysis gases to exhaust vents 34.

Figure 3:
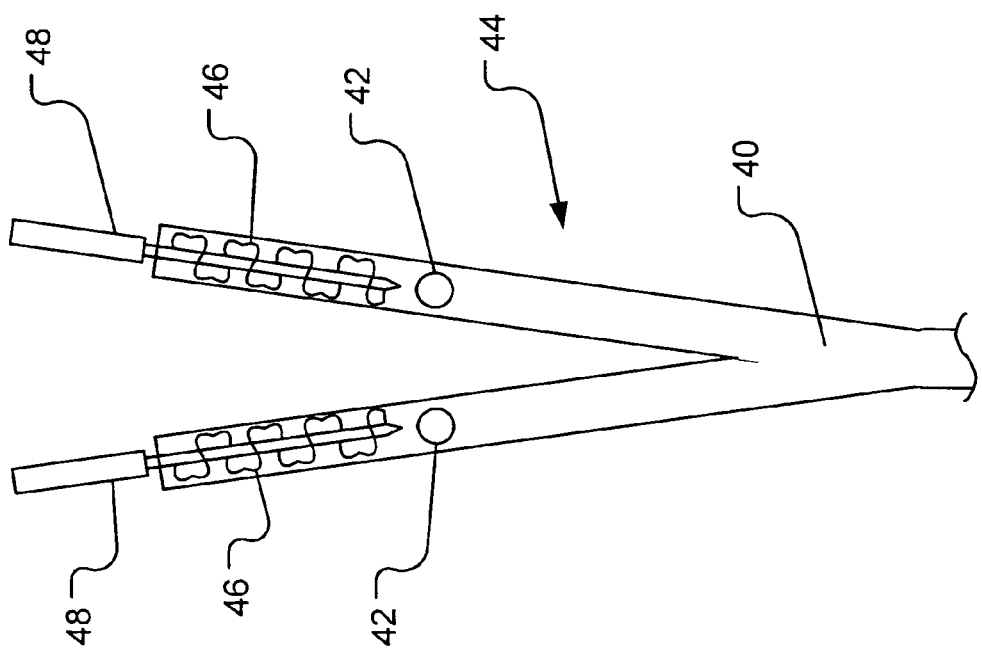
FIG. 3 is a view corresponding to plane I-I of the gas condenser of the reactor shown in FIG. 1.

Exhaust gas vents 34 connect to an exhaust collection vent 38, which connects to transfer vent 40. Transfer vent 40 splits into two arms. Each arm has a valve 42 to control the flow of exhaust gases. Each arm of transfer vent 40 connects to a respective branch of Y-shaped gas condenser 44, as shown in FIG. 3. When gas condenser 44 is clean, both valves 42 remain open. If one of the branches of gas condenser 44 becomes congested (with tar, for example) valve 42 in the corresponding arm of transfer 40 is closed. Once valve 42 is closed, the congested branch of gas condenser 44 may be cleaned by cleaning means while exhaust gas continues to vent through the other arm of transfer vent 40 to its corresponding branch of gas condenser 44. The cleaning means may be an auger 46 driven by a hydraulic piston 48, for example, as shown in the embodiment illustrated in FIG. 3.

Apparatus according to a specific embodiment of the invention will now be described. The following specifications are currently preferred where the organic matter being used as raw material is sawdust. These specifications are included here for illustrative purposes.

The optimal temperature to which furnace 6 should heat retort 4 is approximately 600° C. The interior of furnace 6 is preferably coated with a suitable lining 50 such as a 1500° C. tolerant refractory. Lining 50 should be at least 3 inches thick. Thermal insulation 52, at least one inch thick, should be provided between lining 50 and outer wall 54 of furnace 6. Outer wall 54 may be fabricated of steel.

Retort 4 ideally has an internal diameter of about 14 inches. Diameter 56 of flight 26 is ideally about 12 inches. Enlarged path 36 created by the offset of auger 22 in retort 4 has a maximum height 58 of about 2 inches.

Pitch 60 of flight 26 is ideally about 9 inches. Plug formation tends to occur with substantially lower pitch diameters, while substantially higher pitch diameters do not provide sufficient time for organic material in retort 4 to convert to charcoal.

Auger 22 ideally has two gap sections 28, 28' and two corresponding projections 30, 30'. Gap sections 28, 28' should be about 4 inches in length. First gap section 28 begins at about 12 inches downstream of upstream wall 29 of furnace 6. Second gap section 28' begins at about 24 inches downstream of upstream wall 29 of furnace 6. First and second projections 30, 30' are removably fixed to locations on retort 4 corresponding to about the centre of respective first and second gap sections 28, 28'. Ideally, the distance by which projections 30, 30' project into retort 4 is adjustable, for example by providing threads on projections 30, 30' and corresponding threaded holes in retort 4.

Six exhaust gas vents 34 are ideally provided for each retort 4. This number of exhaust gas vents has been found to provide substantially complete discharge of pyrolysis gases from retort 4.

As will be apparent to those skilled in the art in light of the foregoing disclosure, many alterations and modifications are possible in the practice of this invention without departing from the spirit or scope thereof. For example:

projections 30 may be of various shapes and sizes provided that the overall advancement of organic material is facilitated (by breaking up plugs) rather than impeded (by blocking the flow of the organic material);

more than one projection 30, 30' may correspond to each gap section 28, 28';

fin 32 may be of various, generally flat shapes;

fin 32 may be fixed to core 24 independently of flight 26; and alternative means for cleaning gas condenser 44 may be provided. For example, auger 46 may be substituted with a brush with metallic bristles.

Accordingly, the scope of the invention is to be construed in accordance with the substance defined by the following claims.

I claim:

1. A reactor for converting organic material, the reactor comprising:
    (a) a furnace;
    (b) a retort extending through the furnace, the retort comprising an elongated cylinder having a substantially constant diameter;
    (c) an auger extending through the retort, the auger comprising a flight; and
    (d) one or more members projecting from an interior surface of the retort towards the auger; wherein the flight comprises two or more sections separated by one or more longitudinally extending gaps, and the gaps being coincident with the one or more members.

2. The reactor of claim 1 wherein the auger comprises a core, the core tapering from a first diameter to a second diameter at an inlet region of the retort, wherein the first diameter is greater than the second diameter.

3. The reactor of claim 1 wherein the auger comprises one or more longitudinally extending fins at an outlet region of the retort, wherein the fin projects radially towards the interior surface of the retort.

4. The reactor of claim 1 comprising a gas collection and condensation system, the system comprising:
   (a) one or more gas vents penetrating the retort;
   (b) a collection vent in fluid communication with the one or more gas vents;
   (c) a transfer vent in fluid communication with the collection vent, the transfer vent comprising a plurality of arms, each arm comprising a valve; and
   (d) a gas condenser comprising a plurality of branches, each branch in fluid communication with a corresponding arm, each branch comprising a cleaning means; wherein closing any of the valves directs gases from the retort to the gas condenser through any of the arms with open valves, permitting the branch corresponding to the arm with the closed valve to be cleaned by the cleaning means.

5. The reactor of claim 4, wherein the cleaning means comprise an auger actuated by a hydraulic piston.

6. The reactor of claim 1, wherein a longitudinal axis of the auger is offset in relation to a longitudinal axis of the retort.

7. The reactor of claim 6, wherein the offset is about 2 inches.

8. The reactor of claim 1 wherein the flight comprises three sections separated by two longitudinally extending gaps wherein the flight is at least partially removed, wherein the first gap begins at about 12 inches downstream of an upstream wall of the furnace and the second gap begins at about 24 inches downstream of the upstream wall of the furnace.

9. The reactor of claim 8 wherein the gaps extend longitudinally along the retort for a distance of about 4 inches.

10. The retort of claim 1 wherein the one or more members comprise pins penetrating through a wall of the retort.

11. The reactor of claim 1 wherein an internal diameter of the retort is about 14 inches and a diameter of the flights is about 12 inches.

12. The reactor of claim 1 wherein the auger has a pitch of about 9 inches.

13. The reactor of claim 1 wherein the furnace is capable of heating the retort to a temperature of at least 600° C.

14. A retort for converting organic material, the retort comprising:
   (a) an elongated cylinder having a substantially constant diameter;
   an auger extending through the elongated cylinder, the auger comprising a flight; and
   one or more members projecting from an interior surface of the elongated cylinder towards the auger; wherein the flight comprises two or more sections separated by one or more longitudinally extending gaps, and the gaps being coincident with the one or more members.

15. The retort of claim 14 wherein the auger comprises a core, the core tapering from a first diameter to a second diameter at an inlet region of the retort, wherein the first diameter is greater than the second diameter.

16. The retort of claim 14 wherein the auger comprises one or more longitudinally extending fins at an outlet region of the retort, wherein the fin projects radially towards the interior surface of the retort.

17. The retort of claim 14 wherein a longitudinal axis of the auger is offset in relation to a longitudinal axis of the retort.

18. The retort of claim 17, wherein the offset is about 2 inches.

19. The retort of claim 14 wherein the flight comprises three sections separated by two longitudinally extending gaps wherein the flight is at least partially removed, wherein the first gap begins at about 12 inches downstream of an upstream wall of the furnace and the second gap begins at about 24 inches downstream of the upstream wall of the furnace.

20. The retort of claim 19 wherein the gaps extend longitudinally along the retort for a distance of about 4 inches.

21. The retort of claim 14 wherein the one or more members comprise pins penetrating through a wall of the retort.

22. The retort of claim 14 wherein an internal diameter of the retort is about 14 inches and a diameter of the flights is about 12 inches.

23. The retort of claim 14 wherein the auger has a pitch of about 9 inches.

* * * * *

UNITED STATES PATENT AND TRADEMARK OFFICE
CERTIFICATE OF CORRECTION

| | | |
|---|---|---|
| PATENT NO. | : 7,749,359 B2 | Page 1 of 1 |
| APPLICATION NO. | : 11/409019 | |
| DATED | : July 6, 2010 | |
| INVENTOR(S) | : John Flottvik | |

It is certified that error appears in the above-identified patent and that said Letters Patent is hereby corrected as shown below:

Claim 14 has been amended as shown below to include bullets (b) and (c).

14. A retort for converting organic material, the retort comprising:

(a) an elongated cylinder having a substantially constant diameter;

(b) an auger extending through the elongated cylinder, the auger comprising a flight; and (c) one or more members projecting from an interior surface of the elongated cylinder towards the auger; wherein the flight comprises two or more sections separated by one or more longitudinally extending gaps, and the gaps being coincident with the one or more members.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,749,359 B2  Page 1 of 1
APPLICATION NO. : 11/409019
DATED : July 6, 2010
INVENTOR(S) : John Flottvik It is certified that error appears in the above-identified patent and that said Letters Patent is hereby corrected as shown below:

Column 6, lines 5-15, Claim 14 has been amended as shown below to include bullets (b) and (c).

14. A retort for converting organic material, the retort comprising:

(a) an elongated cylinder having a substantially constant diameter;

(b) an auger extending through the elongated cylinder, the auger comprising a flight; and (c) one or more members projecting from an interior surface of the elongated cylinder towards the auger; wherein the flight comprises two or more sections separated by one or more longitudinally extending gaps, and the gaps being coincident with the one or more members.

This certificate supersedes the Certificate of Correction issued September 21, 2010.

Signed and Sealed this

Twenty-sixth Day of October, 2010

David J. Kappos
*Director of the United States Patent and Trademark Office*